July 7, 1959 W. K. SQUIRES 2,894,060
COLOR TELEVISION RECEIVER
Filed Dec. 16, 1954
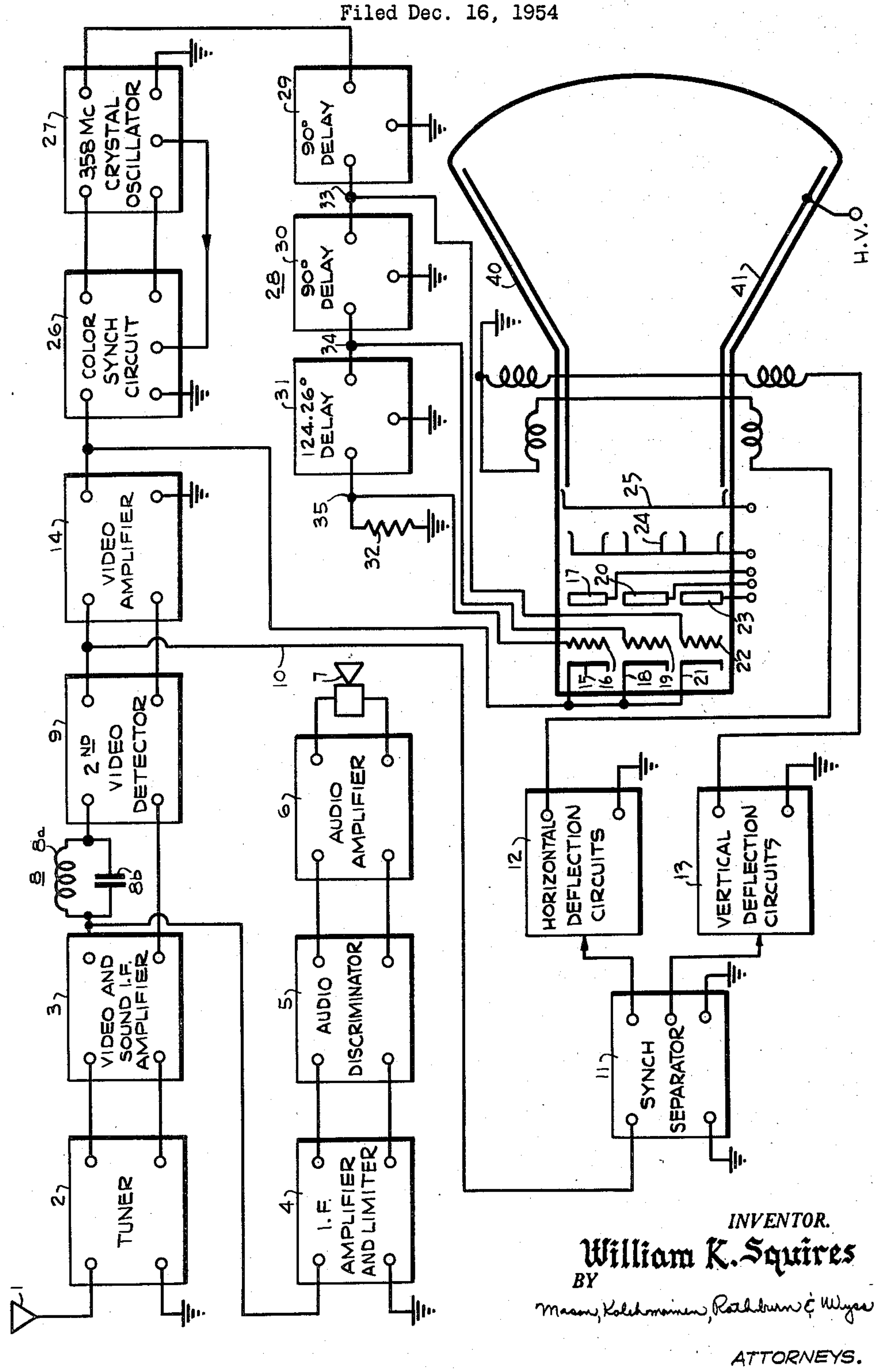
INVENTOR.
William K. Squires
BY
Mason, Kolehmainen, Rathburn & Wyss
ATTORNEYS.

United States Patent Office 2,894,060

Patented July 7, 1959

2,894,060

COLOR TELEVISION RECEIVER

William K. Squires, Snyder, N.Y., assignor, by mesne assignments, to Sylvania Electric Products Inc., Wilmington, Del., a corporation of Delaware Application December 16, 1954, Serial No. 475,710

1 Claim. (Cl. 178—5.4)

The present invention relates to color television receivers, and, more particularly to color television receivers adapted to receive a color television signal of the type which includes a color subcarrier which is modulated in accordance with the desired chrominance information.

In accordance with present-day color television standards, the transmitted color television signal comprises a main video carrier which is modulated by the luminance or brightness information and is also modulated by a color subcarrier which is itself modulated along orthogonally related axes with the desired chrominance or brightness information. In the color television receiver the main video carrier is first demodulated to obtain the luminance signal and the modulated color subcarrier signal. The modulated color subcarrier signal is then demodulated to derive color difference signals corresponding to those developed at the transmitter and these color difference signals are combined with the demodulated luminance signal to obtain the desired red, blue and green color signals which are employed to reconstruct the transmitted image in color by means of a suitable cathode ray tube arrangement. Conventionally, the color subcarrier modulation components are first amplified in a band pass amplifier and are then demodulated by deriving color subcarrier reference signals of the correct phase relationship from the color burst synchronizing signal portion of the received color television signal and heterodyning these reference signals with the color subcarrier modulation components in a pair of synchronous demodulator tubes to produce two color difference signals. The color demodulators of the receiver may either operate along the so-called I and Q axes of the color subcarrier, or, in the alternative, the demodulators may operate along the $B-Y$ and $R-Y$ axes of the color subcarrier, in which latter case the outputs of the $B-Y$ demodulator and the $R-Y$ demodulator are matrixed to obtain the desired $G-Y$ color difference signal. In the IQ system additional phase splitter tubes are required as well as the tubes required to add the color difference signals and the luminance signal together. In the so-called economy type receiver operating on the $B-Y$ and $R-Y$ axes, amplifiers are usually required between the demodulators and the color picture tube. In either system, a considerable number of tubes are required to provide the desired color signals for the picture tube of the color television receiver.

It is, therefore, an object of the present invention to provide a new and improved color television receiver which is substantially simpler than previous receivers of this nature.

It is another object of the present invention to provide a new and improved color television receiver wherein the color subcarrier demodulation portion of the receiver is substantially simplified.

It is a further object of the present invention to provide a new and improved color television receiver wherein demodulation of the color subcarrier portion of a received color television signal is accomplished within the color picture tube of the receiver.

It is a still further object of the invention to provide a new and improved color television receiver wherein the color subcarrier portion of the received color television signal is simultaneously demodulated along three separate axes within the color picture tube of the receiver to provide a substantially simplified color demodulator arrangement.

Briefly, in accordance with one aspect of the invention, a conventional three gun color picture is employed to demodulate the modulated color subcarrier and to combine the detected luminance signal with the demodulated color difference signals to control the intensities of the electron beams of the guns in accordance with the desired red, blue and green signals. To accomplish this, the composite color television signal is detected in a conventional second detector stage and the resultant video wave, which includes the color subcarrier modulation components, is amplified to a suitable level in a conventional video amplifier and is then impressed upon one control electrode of each electron beam forming gun of the tri-color picture tube. A color subcarrier reference signal is developed in the conventional manner and is synchronized with the received color television signal by means of the color burst synchronizing signal portion thereof. From this reference signal three separate color subcarrier reference waves are derived which are separated in phase by amounts corresponding to the color difference modulation axes of the color subcarrier as established by present NTSC standards. These reference waves are individually impressed upon another control electrode of the corresponding electron gun of the tri-color picture tube. Under present NTSC standards, the reference wave which is supplied to the red gun is delayed 90° with respect to the phase of the color burst synchronizing signal portion of the received color television signal, the reference wave which is supplied to the blue gun is delayed 180° with respect to the color burst, and the reference wave which is supplied to the green gun is delayed 304.26° with respect to the color burst. These reference waves are preferably of sufficiently large amplitude to control conduction of the respective electron guns so that the color subcarrier portion of the composite color signal, which is applied to all three guns in parallel, is sequentially sampled at the correct phase angles to produce the desired $R-Y$, $B-Y$ and $G-Y$ color difference signal components. Since the composite color signal applied to all three guns includes the luminance signal components as well as the chrominance components, the color difference signals developed by sampling of the color subcarrier are added to the luminance signal in each gun so as to produce the desired red, blue and green signals.

Additional objects and advantages of the invention will become apparent from a consideration of the following description and accompanying drawing in which the single figure is a schematic, partly diagrammatic illustration of a color television receiver embodying the present invention.

Referring now to the drawing, a receiving antenna 1 is connected to supply a received color television signal to a conventional tuner 2 which in turn produces a corresponding intermediate frequency signal which is amplified in the amplifier 3. This intermediate frequency wave is amplified in the video and sound intermediate frequency amplifier 3 and a portion of the output of this amplifier is coupled to the input of a sound I.F. amplifier and limiter 4. Since the sound or audio information appears in the received wave as frequency modulation on a separate audio carrier wave, a limiter is provided and the frequency modulated wave is demodulated in an audio discriminator 5 to provide a wave varying at audio frequencies in accordance with the sound signal transmitted and which is amplified in an audio power amplifier 6 and used to drive a loud speaker 7. Another portion of the output of the intermediate frequency amplifier 3 is coupled through a trap circuit 8 which is tuned to the I.F. sound carrier and includes the coil 8*a* and the condenser 8*b*, to the input of a conventional video second detector 9. The trap circuit 8 is provided to attenuate the sound carrier before application to the second detector 9 so that undesirable heterodyne components between the sound carrier and the video signal are not produced in the output of the detector 9, as will be readily understood by those skilled in the art. A portion of the output from the second video detector 9 is coupled over a conductor 10 to the input terminals of a synchronizing signal separator circuit 11 wherein the horizontal synchronizing pulses are separated from the vertical synchronizing pulses. The horizontal synchronizing pulses from the separator circuit 11 are supplied to the horizontal deflection circuit 12 which cause the electron beams of the tri-color picture tube 40 to sweep in a horizontal direction in coincidence with the received color television signal. The vertical synchronizing pulses from the separator circuit 11 are supplied to a vertical deflection circuit 13 which deflects the electron beams in the picture tube 40 in the vertical direction in synchronism with the received color television signal. The output signal from the second detector 9 is also supplied to the input terminals of a wide band video amplifier 14.

The picture tube 40 includes three electron guns, one for each of the three primary color components utilized in reproducing the televised image. The green gun includes a cathode 15, a control electrode 16 and an anode 17. The blue gun includes a cathode 18, a control electrode 19 and an anode 20, and the red gun includes a cathode 21, a control electrode 22 and an anode 23. Although the guns of conventional tri-color picture tubes are generally nested at the center of the neck about the longitudinal axis thereof, for purposes of facilitating an understanding of the present invention, the guns are illustrated schematically as being aligned side by side. Also, it will be understood that suitable focusing and convergence electrodes 24 and 25 are normally provided which are energized by suitable potentials as will be readily understood by those skilled in the art. All of the cathodes, 15, 18 and 21, are interconnected and are supplied with the output signal from the video amplifier 14. Since the amplifier 14 has a wide pass band, the composite signal impressed upon the cathodes 15, 18 and 21 from the amplifier 14 includes the chrominance or color subcarrier modulation components as well as the luminance or brightness signal components. In accordance with the present invention the color subcarrier signals are demodulated within the picture tube 40 by controlling conduction of each gun of the tube 40 so that the color subcarrier signal portion of the composite signal impressed upon the cathodes 15, 18 and 21 is sampled at phase angles corresponding to the respective color difference signals. In order to provide suitable reference waves which can be employed to control conduction of the three guns at the required phase angle, the output of the video amplifier 14 is supplied to a color synchronization circuit 26 wherein the color burst synchronizing signal portion of the received color television signal is employed to maintain a 3.58 mc. crystal oscillator 27 in phase with the color burst. In this connection, it will be understood that the color burst is of the same frequency as the color subcarrier and has a predetermined phase relationship with respect to the color difference modulation axes of the color subcarrier signal. Under present NTSC standards the color burst leads the $R-Y$ axis by 90°, the $B-Y$ axis by 180° and the $G-Y$ axis by 304.26°. The output of the oscillator 27 is impressed upon a delay line indicated generally at 28, which is provided with three serially connected sections 29, 30 and 31, the last section 31 being terminated in the impedance 32 to prevent reflected waves from being set up in the sections 29, 30 and 31. The section 29 is designed to delay the reference signal from the oscillator 27 by 90°, it being assumed that the output of the oscillator 27 is in phase with the received color burst, so that a reference wave is produced at the output terminal 33 of the section 29 which is in phase with the $R-Y$ modulation axis of the received color television signal. The reference wave appearing at the output terminal 33 is connected to the control grid 22 of the red gun of the picture tube 40. The section 30 delays the reference signal by an additional 90° so that a reference wave is produced at the output terminal 34 which lags the color burst by 180° and hence coincides with the $B-Y$ axis of the color subcarrier signal. The reference wave appearing at the terminal 34 is connected to the control grid 20 of the blue gun. The section 31 delays the reference signal by an additional 124.26° so that a reference wave is produced at the output terminal 35 thereof which lags the color burst by 304.26° and hence coincides with the $G-Y$ axis of the color subcarrier signal. The reference wave appearing at the terminal 35 is connected to the control grid 17 of the green gun. In this connection it will be understood that the delay line 28 may be of any desired circuit configuration to obtain the indicated phase shifts of the 3.58 mc. reference signal without introducing spurious frequencies or reflected waves, as will be readily understood by those skilled in the art.

Each of the electron guns of the tube 40 is suitably biased to sample the luminance and chroma signal components appearing on the respective cathodes 15, 18, 21. In the interest of high color purity the reference waves impressed upon the control grids 17, 20 and 23 should be as peaked as possible, and the cutoff period in each cycle, for a minimum amplitude cathode signal, should be relatively large. On the other hand, the electron beam of each gun is used for demodulation and for energizing the screen phosphor so that a compromise between picture brightness and color purity must be made. By using reference waves of substantial amplitude, good color purity commensurate with good picture brightness may be achieved. Also, by increasing the potential applied to the high voltage anode 41 of the tube 40 the brightness of the reproduced picture can be increased to compensate for the reduction in electron beam intensities due to the reference waves applied to the control grids 17, 20 and 23.

Whereas conventional receivers as known in the prior art utilize separate channels for amplification of the luminance and chroma signals, the present invention does not separate these signals before application to the picture tube 40. Consequently, the problems normally encountered in equalizing the phase relationships of these signals are obviated in the arrangement of the present invention. In the picture tube 40, the application of the above described reference waves to the control grids 17, 20 and 23 and the application of the color subcarrier signal to the cathodes 15, 18 and 21 causes each electron gun to function as a synchronous demodulator, due to the non-linear characteristic of the gun, so that the desired color difference signal components are developed which collectively represent changes in hue and saturation of each picture element. In addition, the luminance signal components of the composite signal impressed upon the cathodes 15, 18 and 21, i.e., the so-called $E_Y$ signal, are combined with the developed color difference signals so that the intensity of the electron beam of each gun varies in accordance with the desired color signals. If desired, the amplification characteristics of the three electron guns of the picture tube may be so chosen as to give the correct relative values of the red, blue and green signals to give the standard illuminant C or white signal.

Under present day television standards the color subcarrier frequency differs from the sound carrier by approximately 920 kilocycles. If a 920 kilocycle beat frequency component is impressed on the picture tube control elements, a loss in both detail and color, purity would result. Therefore, to minimize the effect of this beat frequency, the trap circuit 8 is tuned to the I.F. sound carrier frequency so that only the video carrier and its luminance and chrominance modulation components are coupled to the second detector 9. Accordingly, even though the composite video signal is impressed upon the cathodes 15, 18 and 21, no undesired beat note component between the video and sound carriers is developed.

While the present invention has been described in connection with a particular embodiment thereof, it will be understood that those skilled in the art may make any changes and modifications without departing from this invention. Therefore, in the appended claims, it is intended to cover all such changes and modifications as fall within the true spirit and scope of this invention.

What is claimed as new and desired to be secured by Letters Patent of the United States is:

A color television receiver circuit for reproducing an image in simulation of its natural colors on the screen of a three-gun color television type cathode ray discharge device in response to a transmitted composite signal including a video modulated carrier wave spaced apart in the frequency spectrum from an audio modulated carrier wave, said receiver circuit comprising means for receiving said composite signal, a video amplifier connected to be supplied with said video modulated carrier wave, a rejection filter tuned to the frequency of said audio carrier wave, said filter being interconnected between said receiving means and said video amplifier to prevent the translation of said audio carrier through said video amplifier, oscillator means for providing three subcarrier frequency waves spaced apart in phase by predetermined phase angles one phase angle spacing being 90° and another being 124.26°, coupling means for connecting the output from said video amplifier to corresponding beam controlling cathode electrodes in the respective guns of said discharge device, and another coupling means for connecting respective ones of said subcarrier frequency waves to other corresponding beam controlling grid electrodes in said discharge device, whereby demodulation of the color components of said composite signal is effected in the guns of the cathode ray discharge device.

References Cited in the file of this patent

UNITED STATES PATENTS

| | | |
|---|---|---|
| 2,680,147 | Rhodes | June 1, 1954 |
| 2,697,744 | Richman | Dec. 21, 1954 |
| 2,743,310 | Schroeder | Apr. 24, 1956 |

OTHER REFERENCES

Introduction to Color Television, Admiral Corp., February 1954, pages 7 to 17.

Color TV, Rider Publications, March 1954, pages 141, 142.

RCA, Model CT–100, Service Data, 1954, No. T3, pages 30 to 34.

General Description of Receivers for the RCA Color Television System which Employ RCA Direct View Tricolor Kinescopes.

Rider Television Manual, vol. 2, Philco Model 48–1001, pages TV2–81, 82.